United States Patent [19]
Miyamoto et al.

[11] Patent Number: 5,241,345
[45] Date of Patent: Aug. 31, 1993

[54] OPTICAL SYSTEM-DRIVING DEVICE

[75] Inventors: Naruyuki Miyamoto, Sakai; Hideo Fukuda, Nishinomiya; Shoichi Kitagawa, Neyagawa; Hiroshi Kusumoto, Wakayama; Yoshifumi Ishii, Daitoh, all of Japan

[73] Assignee: Mita Industrial Co., Ltd., Osaka, Japan

[21] Appl. No.: 783,874

[22] Filed: Oct. 29, 1991

[30] Foreign Application Priority Data

Nov. 17, 1990 [JP] Japan .................. 2-312189

[51] Int. Cl.$^5$ ............................................ G03G 15/28
[52] U.S. Cl. ...................................... 355/235; 355/233
[58] Field of Search ................. 355/234, 235, 233; 192/0.075, 0.096, 0.098, 0.03

[56] References Cited

U.S. PATENT DOCUMENTS

| | | | |
|---|---|---|---|
| 4,148,578 | 4/1979 | Bujese | 355/234 |
| 4,377,337 | 3/1983 | Beck | 355/235 |
| 4,386,842 | 6/1983 | Beery | 355/235 |
| 4,408,867 | 10/1983 | Fujii et al. | 355/235 |
| 4,728,988 | 3/1988 | Tsutsui et al. | 355/235 |
| 4,891,669 | 1/1990 | Hiroki | 355/235 |
| 5,002,366 | 3/1991 | Okazaki | 355/233 X |
| 5,015,936 | 5/1991 | Inoue | 355/235 X |
| 5,021,822 | 6/1991 | Morikawa | 355/235 X |

FOREIGN PATENT DOCUMENTS

| | | | |
|---|---|---|---|
| 0085733 | 4/1988 | Japan | 355/235 |
| 0089834 | 4/1988 | Japan | 355/235 |
| 0100073 | 4/1990 | Japan | 355/235 |

*Primary Examiner*—A. T. Grimley
*Assistant Examiner*—Sandra L. Brasé
*Attorney, Agent, or Firm*—Wenderoth, Lind & Ponack

[57] ABSTRACT

An optical system driving device has a motor which rotates constantly in one direction for providing rotary driving power. A regular rotation electromagnetic clutch is connected to the rotating motor for transmitting driving power to the optical system for reciprocal movement of the optical system in one direction. A reverse electromagnetic clutch connected to the rotor motor transmits driving power to the optical system for reciprocal movement thereof in the opposite direction. A control circuit is provided which receives a pulse signal for controlling either the regular rotation or the reverse electromagnetic clutch at the start of the regular rotation electromagnetic clutch to gradually increase the effective driving power provided to the optical system to move the optical system at the start of movement.

13 Claims, 5 Drawing Sheets

REG – REGULAR ROTATION
REV – REVERSE ROTATION

REG – REGULAR ROTATION
REV – REVERSE ROTATION

OPTICAL SYSTEM-DRIVING DEVICE

BACKGROUND OF THE INVENTION

1. Field of the Invention

The present invention relates to an optical system-driving device provided in an image-reading apparatus such as electrostatic photographic copying machine, facsimile and image scanner.

2. Description of the Prior Art

For example, in an optical system movement-type electrostatic photographic copying machine, one motor is used as a driving source and this motor is always rotated in one direction to convey a transfer paper and move an optical system during the copying.

And, in such the electrostatic photographic copying machine, a so-called one side driving-type optical system-driving device, in which a carriage with an optical member, such as a light source and a mirror, placed thereon is slidably held by a support rod put in said carriage at one end side in a direction meeting at right angles with a moving direction thereof, the other end side being slidably supported by a carriage-supporting member, and said one end side being driven, has been adopted in many cases. In addition, a rotation of the motor is transmitted to a driving pulley through a regular rotation electro-magnetic clutch or a reverse electro-magnetic clutch. That is to say, said regular rotation electro-magnetic clutch is switched on to regularly rotate said driving pulley through the regular rotation electro-magnetic clutch, whereby moving an optical system in a scanning direction, during the scanning of a manuscript while the driving pulley is reversed through said reverse electro-magnetic clutch when said optical system is returned to the home position.

However, in the case where said carriage-supporting rod is put in the carriage with some allowance and the regular rotation electro-magnetic clutch is started, the carriage is vibrated with a sudden start thereof and thus the optical system is vibrated to vibrate said light source, said mirror and the like. As a result, a strain is produced in an image according to circumstances.

So, a device, in which a voltage applied to a regular rotation electro-magnetic clutch is gradually risen by a time-constant of CR in a driving circuit of said regular rotation electro-magnetic clutch to reduce a vibration at a starting time, has been made.

It is, however, difficult to finely regulate said time-constant, so that said sudden start can not be perfectly avoided and accordingly said vibration can not be perfectly eliminated at present.

SUMMARY OF THE INVENTION

The present invention has been achieved paying attention to the above described matters and it is an object of the present invention to provide an optical system-driving device which does not vibrate a carriage even though there is a gap between a carriage-supporting rod and said carriage and thus does not generate a strain of image.

In order to achieve the above described object, in the present invention the following two technical measures are adopted.

In a first measure, in an optical system-driving device, in which a rotation of an always rotating driving source is transmitted to means to be driven through an electro-magnetic clutch to move an optical system, a pulse signal, of which pulse-occupation rate is gradually increased, is put in a control circuit of said electro-magnetic clutch for an appointed time from a start of the electro-magnetic clutch to gradually increase a drive-transmitting power in a regular rotation electro-magnetic clutch at said start of the electro-magnetic clutch.

In a second measure, in an optical system-driving device, in which a rotation of a driving source rotating always in one direction is transmitted to means to be driven through a regular rotation electro-magnetic clutch or a reverse electro-magnetic clutch to reciprocally move an optical system, an appointed voltage is applied to said regular rotation electro-magnetic clutch while a pulse signal, of which pulse-occupation rate is gradually reduced, is put in a control circuit of said reverse electro-magnetic clutch for an appointed time from a start of the regular rotation electro-magnetic clutch to gradually reduce a drive-transmitting power in the reverse electro-magnetic clutch at said start of the regular rotation electro-magnetic clutch.

According to said first measure, a switching-on operation can be slowly and smoothly conducted at the start of the regular rotation electro-magnetic clutch.

In addition, according to said second measure, a load to said optical system is falsely increased, whereby a carriage is slowly and smoothly moved at the start of the regular rotation electro-magnetic clutch.

Accordingly, said carriage is not vibrated and thus a vibration of the optical system can be perfectly prevented by any one of the above described measures.

BRIEF DESCRIPTION OF THE DRAWINGS

One preferred embodiment of the present invention is shown in FIGS. 1 to 6, in which.

DESCRIPTION OF THE PREFERRED EMBODIMENTS

One preferred embodiment of the present invention will be below described with reference to the drawings.

Figure 4:
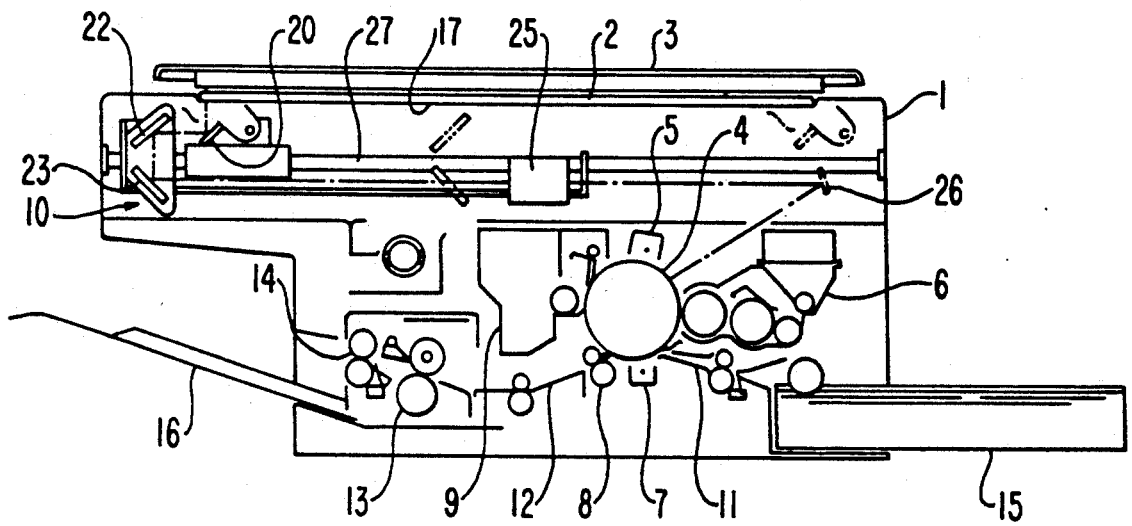
FIG. 4 is a longitudinal sectional view roughly showing an electrostatic photographic copying machine with the optical system-driving device incorporated.

FIG. 4 roughly shows an electrostatic photographic copying machine with an optical system-driving device according to the present invention incorporated. Referring to FIG. 4, reference numeral 1 designates a body of copying machine provided with a contact glass 2 and a manuscript-weight 3 thereon, a photoreceptor 4 and a charging device 5, a developing device 6, a transfer device 7, a paper-separating device 8, a cleaning device 9 and the like arranged around said photoreceptor 4 therewithin, an optical system 10 in a space below said contact glass 2 and a supplied paper-conveying device 11, a discharged paper-conveying device 12, a fixing device 13, a pair of paper-discharging rollers 14, a paper-supplying cassette 15, a paper-discharging tray 16 and the like.

Figure 1:
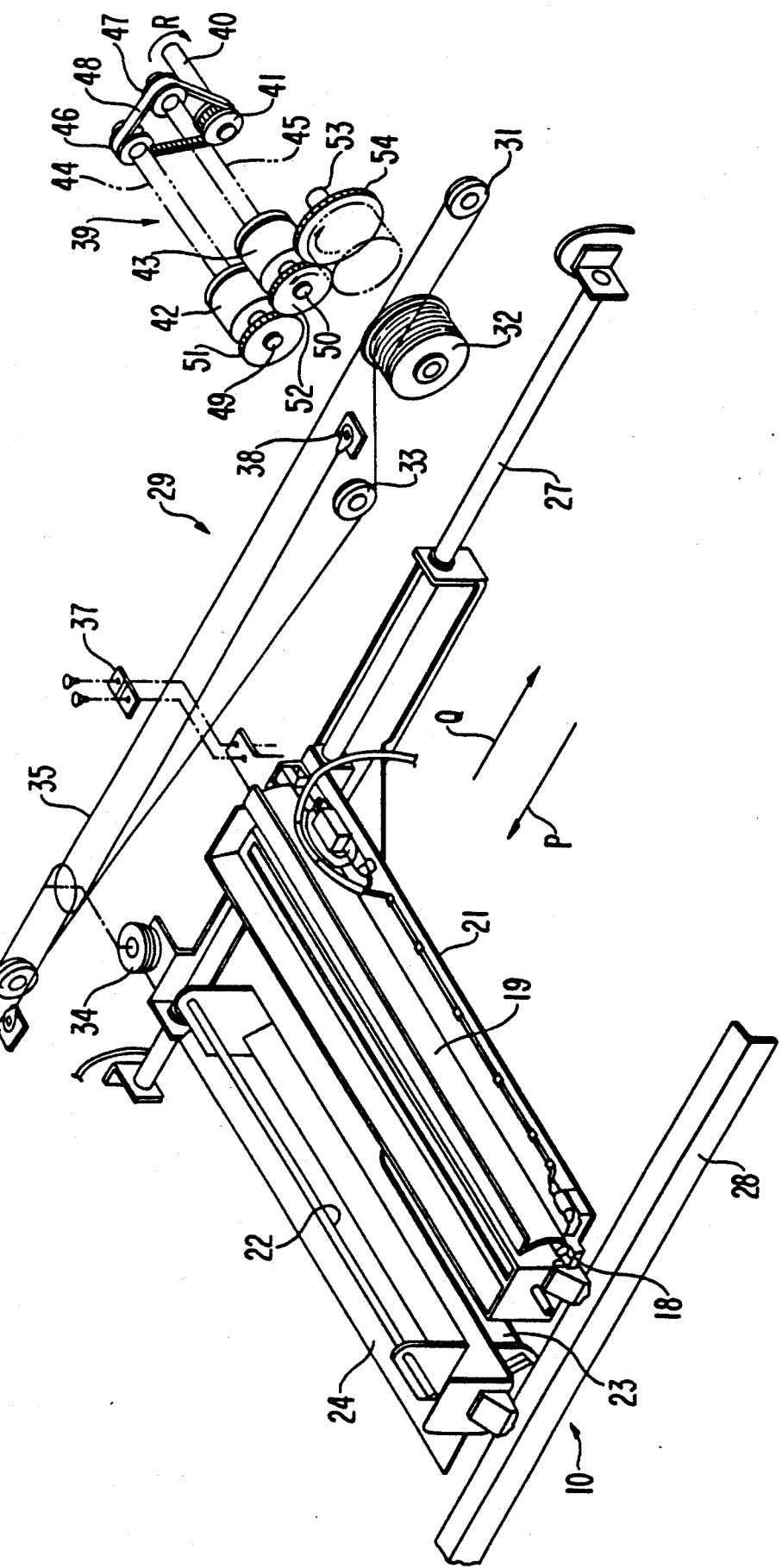
FIG. 1 is a disintegrated perspective view showing an optical system-driving device according to the present invention.
Figure 2:
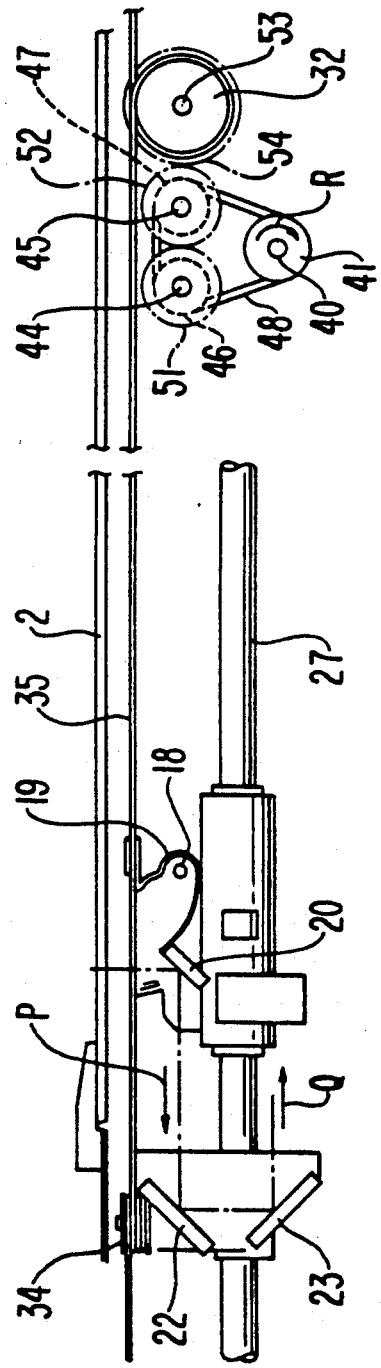
FIG. 2 is a front view showing principal parts in said optical system-driving device shown in FIG. 1.
Figure 3:
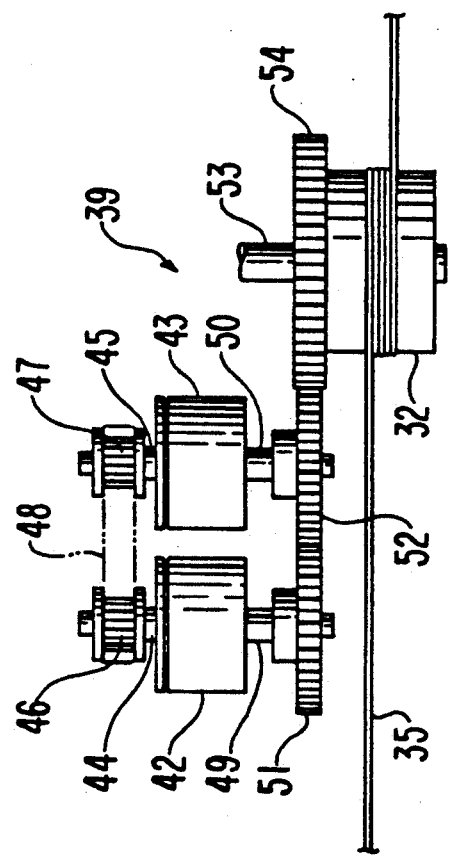
FIG. 3 is a plan view showing principal parts in a regular and reverse rotation-driving mechanism.

Said optical system 10 is provided with a first carriage 21 on which a light source 18 and a reflector 19 for radiating a light to a manuscript surface 17, and a first mirror 20 for reflecting a light reflected by said manuscript in the direction shown by an arrow P are carried, a second carriage 24 on which a second mirror 22 and a third mirror 23 for reflecting a light reflected by said first mirror 20 in the direction shown by an arrow Q opposite to the direction shown by said arrow P are carried, so that they may be reciprocally moved in the directions shown by the arrow P and said arrow Q, a lens device 25 for collecting a light reflected by said third mirror 23 and a fourth mirror 26 for reflecting a light passing through said lens device 25 toward the photoreceptor 4, as shown also in FIGS. 1 to 3.

In addition, reference numerals 27, 28 designate a carriage-supporting rod and a carriage-supporting member supporting both end portions in the direction meeting at right angles with moving directions of said carriages 21, 24 respectively and the carriages 21, 24 are supported at two points by means of two bearings on the side of said carriage rod 27 and at one point on the side of said carriage-supporting member 28 respectively although they are not detailly shown.

Referring to FIGS. 1 to 3, reference numeral 29 designates an optical system-driving device for reciprocally moving the first carriage 21 and the second carriage 24 in the directions shown by the arrows P, Q. Said optical system-driving device 29 has the following construction. That is to say, said body of copying machine 1 is provided with two course-curving revolving members 30, 31 at portions outside of reciprocally moving ranges of the first carriage 21 and the second carriage 24, the body of copying machine 1 being provided with a driving pulley 32 and an intermediate pulley 33 as means to be driven, the second carriage 24 being provided with an idle pulley 34 mounted thereon, and a driving wire 35 being fixedly mounted on a fixing portion 36 on the side of the body of copying machine 1 at one end thereof to extend said driving wire 35 around said idle pulley 34, said one course-curving revolving member 30, said intermediate pulley 33, said driving pulley 32 and said the other course-curving revolving member 31 in the order described, and said driving wire 35 being mounted on the first carriage 21 through a fixing member 37 and extended around the idle pulley 34 again to fixedly mount an end portion thereof on the other fixing portion 38 on the side of the body of the copying machine 1.

And, reference numeral 39 designates a regular and reverse rotation-driving mechanism for regularly or reversely rotating the driving pulley 32 and said regular and reverse rotation-driving mechanism 39 has the following construction. That is to say, a driving shaft 40, to which for example a clockwise rotation (in the direction shown by an arrow R in FIGS. 1, 2) (hereinafter referred to as regular rotation) of a motor (not shown) as a driving source is transmitted, is provided with a sprocket 41 fixedly mounted thereon at one end thereof, input shafts 44, 45 of the regular rotation electro-magnetic clutch 42 and the reverse electro-magnetic clutch 43 being provided with sprockets 46, 47 having the same number of teeth respectively, a rotation-transmitting timing belt 48 being extended around said sprockets 41, 46, 47, output shafts 49, 50 of the regular rotation electro-magnetic clutch 42 and the reverse electro-magnetic clutch 43 being provided with a regular rotation gear 51 and a reverse gear 52 having the same number of teeth, said gears 51, 52 being engaged with each other, and a gear 54 provided on an axis of rotation 53 with the driving pulley 32 fixedly mounted being engaged with said reverse gear 52.

Figure 5:
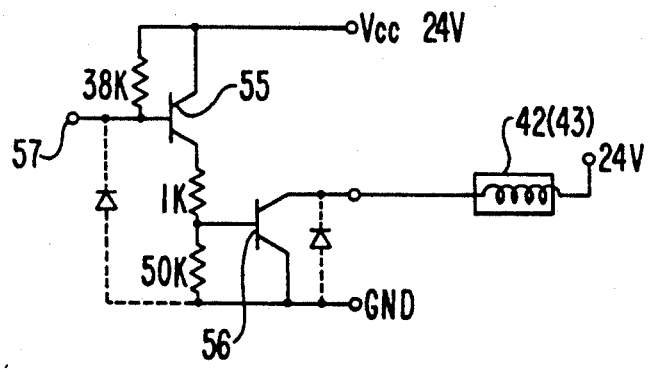
FIG. 5 is a drawing showing one example of a control circuit for an electro-magnetic clutch.

FIG. 5 shows an example of a structure of a circuit for controlling the regular rotation electro-magnetic clutch 42 or the reverse electro-magnetic clutch 43. Referring to FIG. 5, reference numeral 55 designates a PNP-type transistor and reference numeral 56 designates a NPN-type transistor. An appointed voltage is applied to the regular rotation electro-magnetic clutch 42 or the reverse electro-magnetic clutch 43 by putting a pulse signal, which will be mentioned later, as a remote signal in an input terminal 57 of said PNP-type transistor 55 or said NPN-type transistor 56 to suitably switch on and off the regular rotation electro-magnetic clutch 42 or the reverse electro-magnetic clutch 43, whereby reciprocally moving the optical system 10 at an appointed speed. That is to say, upon putting said remote signal of low level in said input terminal 57 of said control circuit for the regular rotation electro-magnetic clutch 42, the PNP-type transistor 55 is switched on and thus the NPN-type transistor 56 is switched on to switch on the regular rotation electro-magnetic clutch 42. Thereupon, the driving pulley 32 is rotated in the regular direction to move the first carriage 21 in the direction shown by the arrow Q in FIG. 1 at a speed 2 times that of the second carriage 24 so that an optical path length from the light source 18 to the lens device 25 may be always constant. In addition, similarly, as soon as the reverse electro-magnetic clutch 43 is switched on, the driving pulley 32 is rotated in the reverse direction to move the first carriage 21 and the second carriage 24 in the direction shown by the arrow P in FIG. 1.

And, in the present invention, in the case where the rotation of said motor rotating always in one direction is transmitted to the driving pulley 32 through the regular rotation electro-magnetic clutch 42 or the reverse electro-magnetic clutch 43, a pulse signal, of which pulse occupation rate is gradually increased, is put in the regular rotation electro-magnetic clutch 42 for an appointed time from starting to falsely switch on and off a current for the regular rotation electro-magnetic clutch 42, whereby perfectly switching on the regular rotation electro-magnetic clutch 42 by an appointed drive-transmitting power after said appointed time has passed, in the start of the regular rotation electro-magnetic clutch 42.

Figure 6:
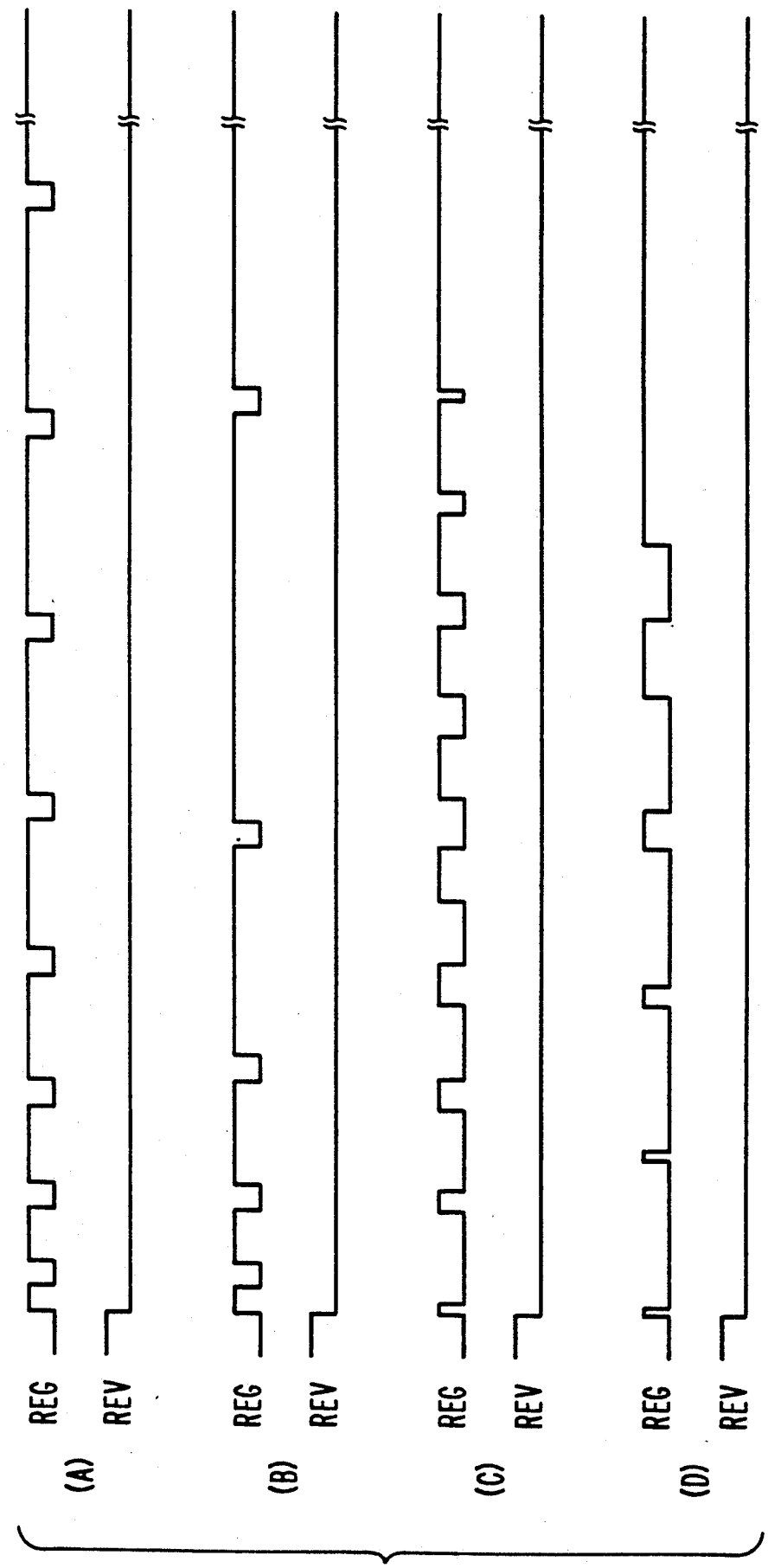
FIG. 6 is a diagram showing wave forms of voltages applied to a regular rotation electro-magnetic clutch and a reverse electro-magnetic clutch.

FIG. 6 shows various kinds of pattern of said pulse signal in the case where the control is carried out in the above described manner. In an example shown in FIG. 6(A), an off-time of the regular rotation electro-magnetic clutch 42 is made always constant while an on-time is increased in an arithmetical ratio. And, in an example shown in FIG. 6(B), said off-time of the regular rotation electro-magnetic clutch 42 is made always constant while said on-time is increased in a geometric ratio. In these cases, said pulse occupation rate of the pulse signal for switching on the regular rotation electro-magnetic clutch 42 is gradually increased and also a pulse space is gradually increased.

In addition, in an example shown in FIG. 6(C), the on-time of the regular rotation electro-magnetic clutch 42 is increased in an arithmetical ratio. And, in an example shown in FIG. 6(D), the on-time of the regular rotation electro-magnetic clutch 42 is increased in a geometric ratio. In these cases, said pulse space of the pulse signal for switching on the regular rotation electro-magnetic clutch 42 is constant.

And, in any one of the above described examples, an on-operation in the starting of the regular rotation electro-magnetic clutch 42 is slowly and smoothly conducted. As a result, the carriages 21, 24 are not rickety and thus the optical system 10 is not vibrated during the exposure of the manuscript and the like, so that the manuscript can be surely read and thus an image having no strain can be formed even though there is a gap between the carriage-supporting rod 27 and the carriages 21, 24.

Although the drive-transmitting power of the regular rotation electro-magnetic clutch 42 is gradually increased to perfectly switch on the regular rotation electro-magnetic clutch 42 by the appointed drive-transmitting power after the appointed time has passed in the starting of the regular rotation electro-magnetic clutch 42 in the above described preferred embodiment, a load to the optical system 10 may be falsely increased for the appointed time from the starting of the regular rotation electro-magnetic clutch 42. That is to say, an appointed voltage is applied to the regular rotation electro-magnetic clutch 42 while a pulse signal, of which pulse occupation rate is gradually reduced, is put in a control circuit of the reverse electro-magnetic clutch 43 for the appointed time from the starting of the regular rotation electric-magnetic clutch 42 to falsely increase said load to the optical system 10 in the starting of the regular rotation electro-magnetic clutch 42.

Figure 7:
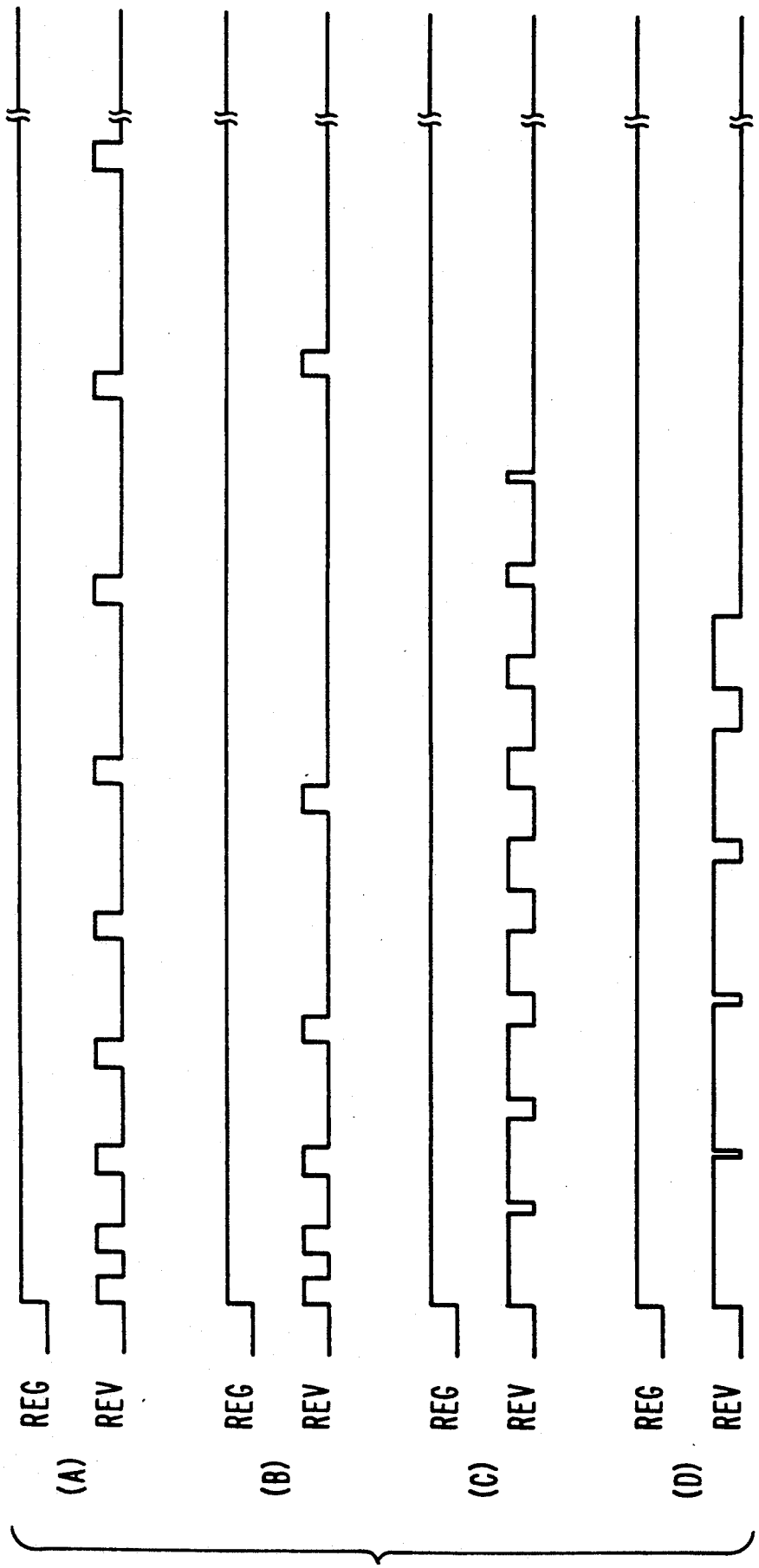
FIG. 7 is a diagram showing wave forms of voltages applied to a regular rotation electro-magnetic clutch and a reverse electro-magnetic clutch according to another preferred embodiment.

FIG. 7 shows various kinds of pattern of the pulse signal in the case where the control is carried out in the above described manner. In an example shown in FIG. 7(A), an appointed voltage is applied to the regular rotation electro-magnetic clutch 42 to switch on it and at the same time the on-time of the reverse electro-magnetic clutch 43 is held constant to increase the off-time in an arithmetical ratio. And, in an example shown in FIG. 7(B), an appointed voltage is applied to the regular rotation electro-magnetic clutch 42 to switch on it and at the same time the on-time of the reverse electro-magnetic clutch 43 is held constant to increase the off-time in a geometric ratio. In these cases, the off-time of the pulse voltage applied to the reverse electro-magnetic clutch 43 is gradually increased and the pulse occupation rate is gradually reduced to become zero after the appointed time.

In addition, in an example shown in FIG. 7(C), an appointed voltage is applied to the regular rotation electro-magnetic clutch 42 to switch on it and at the same time the off-time of the reverse electro-magnetic clutch 43 is increased in an arithmetical ratio. And, in an example shown in FIG. 7(D), an appointed voltage is applied to the regular rotation electro-magnetic clutch 42 to switch on it and at the same time the off-time of the reverse electro-magnetic clutch 43 is increased in a geometric ratio. In these case, the pulse occupation rate is gradually reduced to become zero after the appointed time and the pulse space is constant.

And, in any one of the above described examples, the load to the optical system 10 is falsely increased in the starting of the regular electro-magnetic clutch 42. As a result, the carriages 21, 24 can be slowly and smoothly moved and thus the same effects as in the above described preferred embodiment can be exhibited.

Since the present invention has the above described construction, the carriages are not vibrated in the starting of the regular rotation electro-magnetic clutch and thus the strain of image due to the vibration of the optical system can be prevented and the manuscript and the like can be surely read and thus the clear image can be formed in for example the electrostatic photographic copying machine and the like even though there is a gap between the carriage-supporting rod and the carriages.

What is claimed is:

1. An optical system driving arrangement for driving an optical system to be moved, comprising:
   rotating driving means for providing rotary driving power by undergoing constant rotation;
   an electromagnetic clutch connected to said rotating driving means for transmitting driving power to the optical system to be moved; and
   a control means for controlling said electromagnetic clutch, said control means comprising a circuit receiving a pulse signal from the start of said electromagnetic clutch for a predetermined amount of time, said pulse signal having a pulse occupation rate which gradually increases to gradually increase the amount of driving power transmitted by said electromagnetic clutch at said start thereof, and said pulse signal comprising pulses of on times of said electromagnetic clutch and off times of said electromagnetic clutch.

2. The optical system driving arrangement of claim 1, wherein said on times gradually increase arithmetically while said off times are maintained constant.

3. The optical system driving arrangement of claim 1, wherein said on times gradually increase geometrically while said off times are maintained constant.

4. The optical system driving arrangement of claim 1, wherein said on times gradually increase arithmetically and said off times gradually decrease arithmetically.

5. The optical system driving arrangement of claim 1, wherein said on times gradually increase geometrically and said off times gradually decrease geometrically.

6. An optical system driving arrangement for driving an optical system to be moved, comprising:
   a rotating driving means for providing rotary driving power by undergoing constant rotation;
   a regular rotation electromagnetic clutch connected to said rotating driving means for transmitting driving power to the optical system for reciprocal movement of the optical system in one direction;
   a reverse electromagnetic clutch connected to said rotary driving means for transmitting driving power to the optical system for reciprocal movement of the optical system in an opposite direction; and
   a control means for controlling said reverse electromagnetic clutch, said control means comprising a circuit receiving a pulse signal from the start of said regular rotation electromagnetic clutch receiving a predetermined voltage, said pulse signal having a pulse occupation rate which is gradually reduced and being received by said control circuit for a predetermined period of time from said start of said regular rotation electromagnetic clutch to gradually reduce the amount of driving power transmitted by said reverse electromagnetic clutch at said start of said regular rotation electromagnetic clutch.

7. The optical system driving arrangement of claim 6, wherein said rotating driving means comprises a motor.

8. The optical system driving arrangement of claim 6, wherein each said electromagnetic clutch has a gear, said gears being engaged with each other.

9. The optical system driving arrangement of claim 6, wherein said pulse signal comprises pulses of on times of said reverse electromagnetic clutch and off times of said reverse electromagnetic clutch.

10. The optical system driving arrangement of claim 9, wherein said on times are maintained constant and said off times increase arithmetically.

11. The optical system driving arrangement of claim 9, wherein said on times are maintained constant and said off times increase geometrically.

12. The optical system driving arrangement of claim 9, wherein said on times gradually decrease arithmetically and said off times gradually increase arithmetically.

13. The optical system driving arrangement of claim 9, wherein said on times gradually decrease geometrically and said off times gradually increase geometrically.

* * * * *